Oct. 18, 1932.  A. P. BUISSET  1,883,530
TIGHTENING DEVICE
Filed July 12, 1930
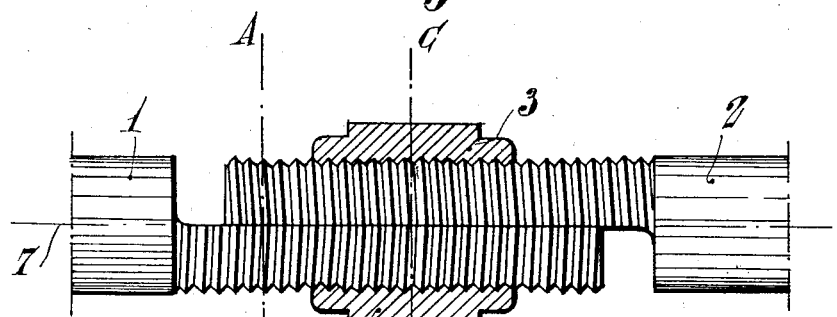
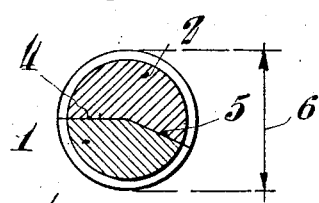
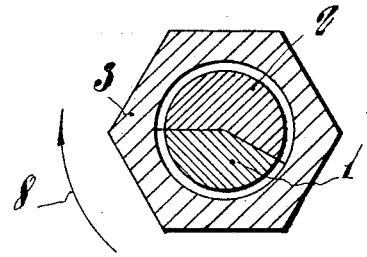
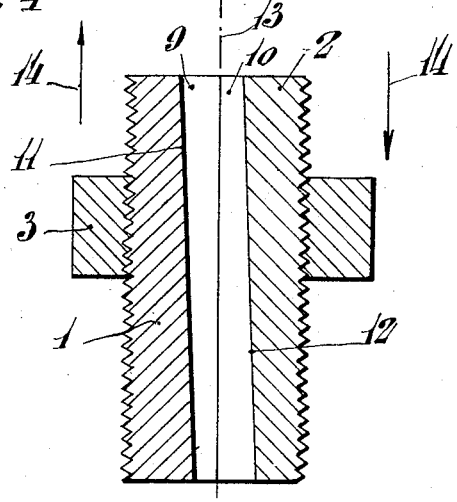
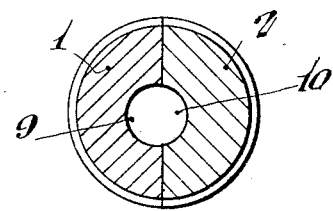
INVENTOR.
André P. Buisset.
By William C. Linton
Attorney.

Patented Oct. 18, 1932

1,883,530

UNITED STATES PATENT OFFICE

ANDRÉ PAUL BUISSET, OF MEZIERES, FRANCE

TIGHTENING DEVICE

Application filed July 12, 1930, Serial No. 467,570, and in France October 17, 1929.

The present invention relates to tightening devices and primarily aims to provide a device essentially consisting of two co-operating complementary parts each being formed with a screw thread proceeding respectively in a right and left handed direction, certain parts being associated with a nut threaded interiorly with right and left hand threads, whereby upon turning the nut, the parts of the device will be caused to move in opposite directions with respect to each other.

The invention further contemplates the provision of a device having a pair of co-operating parts acted upon by means of a nut to move respectively, in opposite directions, said parts being formed with internal recesses co-operating to constitute a bore wherein may be introduced one or more foreign members, said recesses in the co-operating parts of the device being formed to wedge or bind the foreign member or members therebetween upon actuation of said parts.

Other important objects and advantages of the invention will be in part obvious and in part pointed out hereinafter.

In order that the invention and its mode of operation may be readily understood by those skilled in the art, I have in the accompanying drawing and in the detailed description based thereupon, set out possible embodiments of the same.

In the drawing:

Figure 1 is an elevation of my improved device with the nut shown in cross section;

Figure 2 is a section on line A—B of Figure 1;

Figure 3 is a section on line C—D of Figure 1;

Figure 4 is a longitudinal section of the device provided with holding means, and Figure 5 is a section of the same.

Having more particular reference to the drawing wherein like characters of reference will designate corresponding parts throughout, my improved device may be stated to comprise a pair of juxtaposed co-operating parts 1 and 2 respectively having their outer surfaces correspondingly rounded and formed respectively with left and right threads, adapted to be placed in engagement with a nut 3 threaded with right and left hand threads extending throughout the entire length of the inner peripheral surface of the nut, said threads crossing each other in the manner commonly done in the art for the manufacturing of double-threaded nuts.

The cross sectional configurations of the parts 1 and 2 are complementary sectors of the same circle so that when the parts are placed upon one another, their outer correspondingly rounded surfaces will form a complete circle. Obviously, the line of separation 4—5 between the parts of the device may have any desired configuration, for instance, a straight, broken, curved, or composite line.

Since the separating surface has the line 4—5 as its directrix between the parts 1 and 2, its generatrices will be parallel with the axis of the parts of which the diameter 6 is that of the circle represented by the assembly of said parts.

The nut 3 being interiorly threaded for engagement with the left and right handed threads of the co-operating parts 1 and 2, it may be screwed thereon to impart a relative movement to said parts. In the position shown in Figure 1, if the parts 1 and 2 are held against rotation but have a free straight motion, and if the nut 3 is held against straight motion but free to rotate about the axis 7, it will be understood that by turning the nut 3 in the direction indicated by the arrow 8, that is, in a clockwise direction, the part 1 having the right handed thread will move to the left, whereas the part 2 having the left handed thread will move to the right. Thus, the two parts will have a straight motion upon one another.

Obviously, if one of the parts is turned while held against straight motion and the nut is held against rotation, the latter will be displaced on the fixed part thus causing the other part to be displaced relatively to the nut and the fixed part.

Figures 4 and 5 illustrate my improved device provided with holding means. The inner adjacent surfaces of the co-operating complementary parts 1 and 2 are provided with recesses 9 and 10, respectively, formed longitudinally thereof and extended in an inverse inclined relation with respect to the body of said parts, that is, the generatrix of the recesses 9 and 10 are inclined from the axis 13 of the assembled device.

It will be understood that the recess in one part co-operating with the other part, will constitute a bore, wherein may be introduced one or more foreign members such as cables, and that upon imparting a movement by actuation of the nut 3 to the parts 1 and 2 in the direction of the arrows 14, the foreign member or members will be wedged or bound between said parts due to the inclined co-operating recesses therein.

Manifestly, the construction shown is capable of considerable modification and such modifications as come within the scope of my claims, I consider within the spirit of my invention.

I claim:

1. A device of the character described comprising a pair of juxtaposed cooperating parts each having their outer surfaces correspondingly rounded and formed respectively with left and right threads, the inner adjacent surfaces of said parts each having a recess formed longitudinally thereof and extended in an inverse inclined relation with respect to the body of said parts, the recess in one part cooperating with the recess in the other part to constitute a bore adapted to receive a foreign member therein, and a nut in engagement with the threads on said parts and adapted to move the same in relatively opposed directions, whereby through the inclined cooperating recesses in said parts, to bind the foreign member received therebetween.

2. A device of the character described comprising a pair of juxtaposed cooperating parts each having their outer surfaces correspondingly rounded and formed respectively with left and right threads, the normal cross section of one thread being a sector of a circle and the normal cross section of the other thread being the other sector of the same circle, the inner adjacent surfaces of said parts each having a recess formed longitudinally thereof and extended in an inverse inclined relation with respect to the body of said parts, the recess in one part cooperating with the recess in the other part to constitute a bore adapted to receive a foreign member therein, and a nut in engagement with the threads on said parts and adapted to move the same in relatively opposed directions, whereby through the inclined cooperating recess in each part, to bind the foreign member received therebetween.

In witness whereof I have hereunto set my hand.

ANDRÉ PAUL BUISSET.